United States Patent Office 3,495,928
Patented Feb. 17, 1970

3,495,928
DYEING PROCESS
Kurt Weber, Basel, Switzerland, assignor to Ciba Limited,
Basel, Switzerland, a company of Switzerland
No Drawing. Filed Nov. 9, 1965, Ser. No. 507,063
Claims priority, application Switzerland, Nov. 20, 1964,
14,976/64; Oct. 1, 1965, 13,611/65
Int. Cl. C09b 5/60
U.S. Cl. 8—35                                                     7 Claims

ABSTRACT OF THE DISCLOSURE

Dyeings are produced on natural and regenerated cellulose with dioxazine dyestuffs that contain in the molecule one to four sulphonic or carboxyl groups and, apart from the dioxazine chromophore, no vattable polycyclic quinone residue, when the dyestuffs are reduced to the leuco form in a strong alkaline medium by means of strong reducing agents and the leuco compound is subsequently reoxidized on the fibre.

---

The dyeing of textile materials with water-soluble dioxazine dyestuffs is known.

The present invention is based on the observation that specially valuable dyeings can be produced on natural and regenerated cellulose with dioxazine dyestuffs that contain in the molecule one to four sulphonic or carboxyl groups and, apart from the dioxazine chromophore, no vattable polycyclic quinone residue, when the dyestuffs are reduced to the leuco form in a strong alkaline medium by means of strong reducing agents and the leuco compound is subsequently reoxidized on the fibre.

The term "dioxazine dyestuffs" as used in the process of the present invention refers primarily to organic compounds of the formula

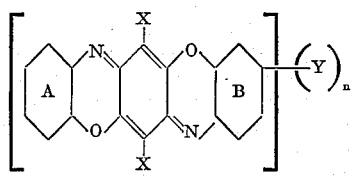

in which Y represents a sulphonic acid or a carboxyl group, $n$ is an integer from 1 to 4 and X represents a halogen atom, and in which the rings A and B may contain further substituents and/or condensed heterocyclic or carbocyclic rings.

The said dioxazine dyestuffs must be free from phosphoric acid groups and vattable polycyclic quinone residues. The process of the invention is particularly suitable for dyeing natural or regenerated cellulose in an alkaline, aqueous medium having a pH value of at least 9.

The dioxazine dyestuffs primarily used in the process of the invention are those of the above formula in which the substituent X is a chlorine atom. Known dyestuffs of the kind defined are, for example, those of the formulae

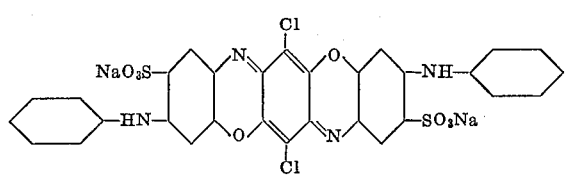

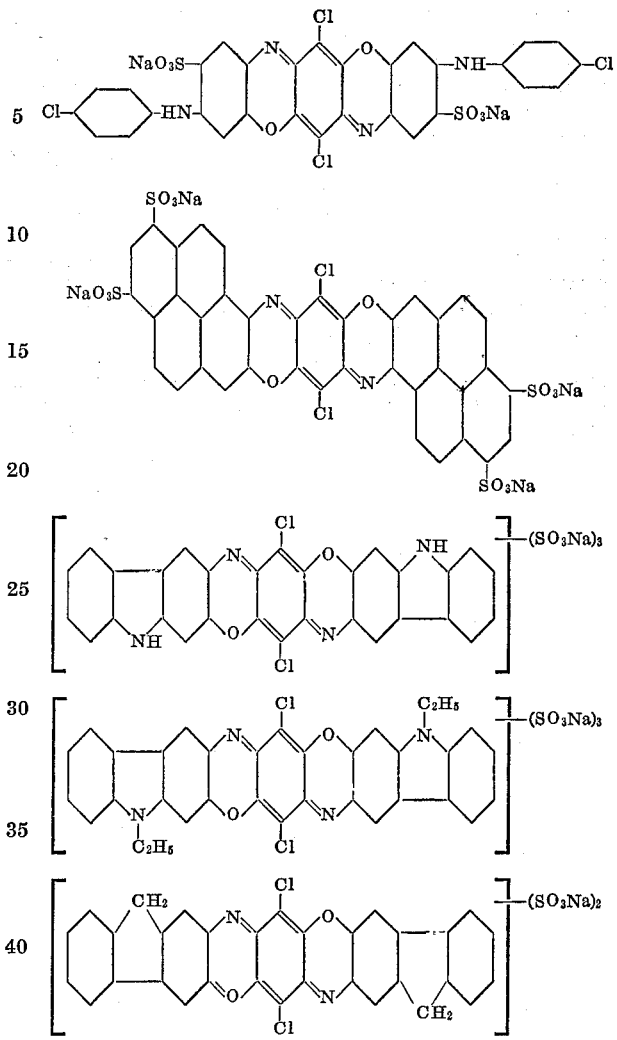

The said dyestuffs can be produced in known manner, for example, by acylation, condensation or sulphonation.

The above-mentioned cellulosic materials, which include both man-made fibres made, for example, from regenerated cellulose, for example, viscose rayon, and natural cellulosic fibres for example linen and, in particular cotton, can be treated with these dyestuffs either in a dyebath using a long liquor-to-goods ratio or, in particular, by impregnation on a padding mangle. It is advantageous to use aqueous solutions of the dyestuffs. Specially attractive effects can be obtained by the so-called cold pad-batch process in which the dyestuff is padded on to the material and fixed by storing the batched up material at room temperature or at a slightly elevated temperature with exclusion of air.

It is advantageous to add more or less neutral salts, especially inorganic salts for example akali metal chlorides or sulphates, to the dyebath, either at the same time as the dyestuffs or during the dyeing process, if necessary, in portions. When applying the dyestuffs used in accordance with the invention to cellulosic fibres it is advantageous to render the dyebath distinctly alkaline by the addition of an alkali, for example, sodium carbonate, potassium carbonate or an alkali solution, the addition being made either at the commencement of the dyeing process or during the process. After the dyestuffs have been applied to the material, for example, by padding, the material can be treated in a fresh alkaline bath to fix the dyestuffs; the impregnated material may be dried prior to this treatment.

The reducing agents used may be strong reducing agents for example sodium hydrosulfite, thiourea dioxide or α-hydroxyalkane-sulfonic acids, if necessary, together with redox catalysts, which are chelate complexes or chelates of polyvalent transition metals in which the lowest valency in the complex is not the most stable one. Redox catalysts of the kind defined have as central atom metals capable of displaying different valency values and which can easily be converted from one valency value to another. Furthermore, they must be soluble in water and preferably stable towards strong alkalis; however, they must not impart their color permanently to the material to be dyed. It is thus advantageous to use compounds that do not have affinity for the substratum or that do not decompose, because otherwise colored complexes or decomposition products would modify the tint desired or cause dulling. The most suitable metals are the transition metals having the atomic numbers 24 to 28, that is to say, chromium, manganese, iron, cobalt and nickel. Cobalt is of special importance. Complexes which meet these requirements may be, for example, compounds in which the central metal atom is surrounded most closely by four nitrogen atoms all of which may belong to the same molecule. Alternatively, two of the said nitrogen atoms may be constituents of one molecule and the other two constituents of another molecule, which molecules may be identical or different. Examples of compounds in which the four nitrogen atoms surrounding the central metal atom belong to a single molecule are the porphyrins and tetrazoporphyrins. Compounds having two nitrogen atoms capable of complex formation are, for example, nitrogen-containing heterocycles. As examples of such compounds there may be mentioned dipyridyl and phenanthroline, it being understood, of course, that other heterocycles having a similar constitution can also be used.

It is also possible to use compounds in which one nitrogen atom is a constituent of a ring and the other is a member of a side-chain. Accordingly, α-aldehyde-hydrazines, α - aldehyde - semicarbazones or α - aldoximes may be used; pyridine - 2 - aldoxime is an example. However, compounds that are specially suitable are the hydrazones, semicarbazones or oximes of aliphatic, aliphatic-aromatic or cycloaliphatic dicarbonyl compounds (that is to say, diketones and dialdehydes) in which the carbonyl groups are in 1,2- or 1,3-position to each other, for example, 1,2- or 1,3-dialdehydes, 1,2- or 1,3-diketones or 1,2- or 1,3-aldehyde-ketones. Aldehydes and ketones of the kind defined are, for example, glyoxal, malonic acid dialdehyde, methylglyoxal, formylacetone, diacetyl, acetylacetone, benzil or the homologues thereof or also cyclohexane-1,2-dione.

The amounts in which these complexes are used may vary within fairly wide limits. They may be used, for example, in amounts between 0.01 and 1%, based on the total amount of the preparation. However, it is generally sufficient to use amounts between 0.05 and 0.1%.

The dyebaths may be prepared by adding the dioxazine dyestuff, the reducing agent, the alkali and, if required, the more or less neutral inorganic salts either simultaneously or singly one after the other, to the water, but the dyestuffs and their salts may also be processed into pastes or, preferably, dry preparations before they are used.

Compared with the traditional direct method of dyeing with the dioxazine dyestuffs indicated herein, the process of the present invention has the advantage of producing more level dyeings and a much better colour yield. This is surprising since the process of the invention is carried out in a strong alkaline medium and it is known that the dioxazine dyestuffs to be used in accordance with the invention are sensitive even to a weak alkali.

The following examples illustrate the invention. The parts and percentages are by weight.

In general, the dyestuffs are not indicated as free acids, but as sodium salts. However, they may also be used in the form of other salts, especially in the form of potassium or ammonium salts.

EXAMPLE 1

2 parts of the dyestuff of the formula

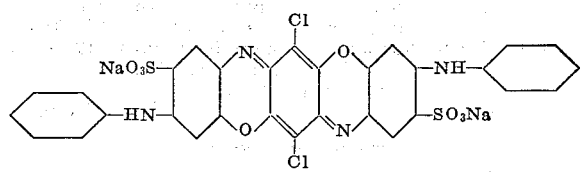

Colour Index No. 51,300 are dissolved at the boil in 500 parts of water. The blue solution is poured into a solution of 20 parts of 30% sodium hydroxide solution and 12 parts of sodium hydrosulphite in 3,500 parts of water, which solution has a temperature of 60° C. 100 parts of well-wetted cotton is entered into this dyebath at 60° C. and dyeing is carried out for 45 minutes at that temperature. After dyeing for 10 minutes, 40 parts of anhydrous sodium sulphate are added, and 20 minutes later a further 40 parts of anhydrous sodium sulphate are added. The cotton is then removed from the dyebath, oxidized in the air and then thoroughly rinsed in running water. A strong, brilliant blue dyeing is obtained.

A much weaker dyeing is obtained when the above process is carried out in the absence of a reducing agent. A much weaker dyeing is also obtained when the same dyestuff is applied by the conventional direct dyeing method at 100° C. in the presence of 40% of anhydrous sodium sulphate based on the weight of the cotton.

EXAMPLE 2

100 parts of cotton are dyed with 2 parts of the dyestuff of the formula

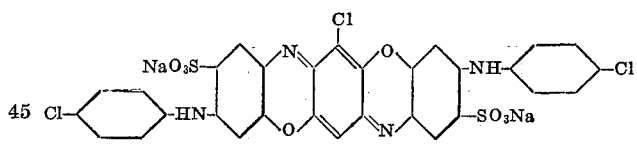

by the process described in Example 1. A strong blue dyeing is obtained that is considerably stronger than a dyeing obtained by the conventional direct dyeing method.

EXAMPLE 3

100 parts of cotton are dyed with 2 parts of the dyestuff of the formula

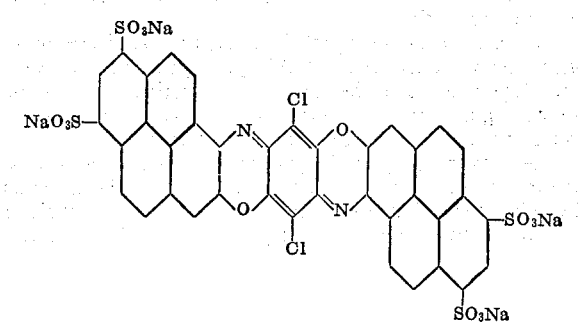

Colour Index No. 51,310 by the process described in Example 1 but at 95° C. A strong blue dyeing is obtained that is stronger than a dyeing obtained by the conventional direct dyeing method.

EXAMPLE 4

100 parts of cotton are dyed with 2 parts of the dyestuff of the formula

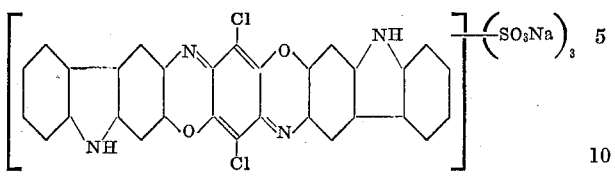

Colour Index No. 51,315 by the process described in Example 1. A strong, reddish blue dyeing is obtained that is considerably stronger than a dyeing produced by the conventional direct dyeing method.

EXAMPLE 5

100 parts of cotton are dyed with 2 parts of the dyestuff of the formula

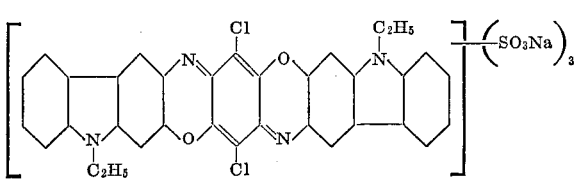

Colour Index No. 51,320 by the process described in Example 3. A strong, brilliant blue dyeing is obtained that is considerably stronger than a dyeing produced by the conventional direct dyeing method.

EXAMPLE 6

2 parts of the dyestuff of the formula

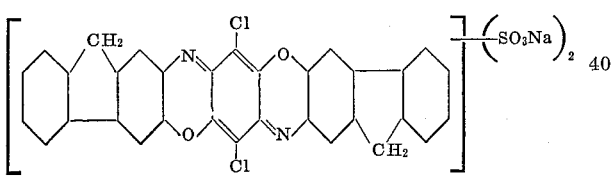

Colour Index No. 51,325 are applied by the process described in Example 1. A strong violet dyeing is obtained that is considerably stronger than a dyeing produced by the conventional direct dyeing method.

EXAMPLE 7

Cold pad-batch process 2 parts of the dyestuff used according to Example 1 are dissolved, together with 0.1 part of the cobalt complex of dimethylglyoxime of the formula

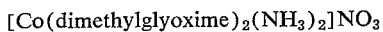

[Co(dimethylglyoxime)$_2$(NH$_3$)$_2$]NO$_3$ in 91 parts of boiling water. After the solution has cooled to 25° C., 5 parts of 30% sodium hydroxide solution, 3 parts of sodium formaldehyde-sulphoxylate and 4 parts of a 25% sodium sulphate solution are added.

10 parts of mercerized and bleached cotton satin are padded cold on a two-roll padding mangle with the above dyestuff solution in a manner such that the fabric takes up 60 to 70% of its dry weight of dye-liquor. The padded fabric is then batched up immediately without intermediate drying, wrapped in a plastic film and stored therein for 14 hours at a temperature of 30° C. The cotton fabric is then unrolled and hung in the air for 30 minutes, thoroughly rinsed in cold running water and dried. A strong blue dyeing is obtained.

When the above process is carried out in the absence of reducing agent, cobalt complex and alkali solution, the blue dyeing obtained is three times weaker.

EXAMPLE 8

Pad-steam process

Mercerized and bleached cotton satin is padded with the dyestuff solution described in Example 7 by the method described therein. The material is then immediately steamed for one minute at 100° C. and then further processed in the manner described in Example 7.

A strong, blue dyeing is obtained that is considerably stronger than a dyeing produced by the same process, but in the absence of reducing agent, cobalt complex and alkali solution.

EXAMPLE 9

Cold pad-batch process 2 parts fo the dyestuff used in Example 1 are dissolved in 91 parts of boiling water. After cooling the solution to 25° C., 5 parts of 30% sodium hydroxide solution, 2 parts of thiourea dioxide and 4 parts of 25% sodium sulphate solution are added.

10 parts of mercerized and bleached cotton satin are padded cold on a two-roll padding mangle with the above dyestuff solution in a manner such that the fabric takes up 60 to 70% of its dry weight. The padded fabric is then batched up immediately without intermediate drying, wrapped in a plastic film and stored therein for 8 hours at a temperature of 30° C. The cotton fabric is then unrolled and hung in the air for 30 minutes, thoroughly rinsed in cold running water and dried. A strong blue dyeing is obtained.

When the above process is carried out in the absence of reducing agent, the blue dyeing obtained is six times weaker.

EXAMPLE 10

Pad-steam process 2 parts of the dyestuff used in Example 1 are dissolved in 79 parts of boiling water. 5 parts of 30% sodium hydroxide solution and 3 parts of sodium hydrosulphite are added and the dyestuff is reduced in the hot solution. The solution of reduced dyestuff is then cooled to 25° C. and 16 parts of 25% sodium sulfate solution are added.

Mercerized and bleached cotton satin is padded with the dyestuff solution so prepared in the manner described in Example 7. The material is then immediately steamed for one minute at 100° C. and further treated in the manner described in Example 7.

A strong blue dyeing is obtained that is considerably stronger than a dyeing produced by the same process with the same dyestuff concentration, but in the absence of reducing agent and alkali solution.

EXAMPLE 11

2 parts of the dyestuff used in Example 1 are dissolved in 500 parts of boiling water. The blue solution is poured into a solution of 20 parts of 30% sodium hydroxide solution and 12 parts of sodium hydrosulfite in 3,500 parts of water, which solution has a temperature of 60° C. 100 parts of a well-wetted fabric made of regenerated cellulose staple fibers (viscose) are entered into the dyebath so prepared at 60° C. and dyeing is carried out for 45 minutes at that temperature. After dyeing for 10 minutes, 40 parts of anhydrous sodium sulfate are added, and 20 minutes later a further 40 parts of anhydrous sodium sulfate. The material is then removed from the dyebath, oxidized in the air and thoroughly rinsed in running water. A strong, brilliant blue dyeing is obtained.

When dyeing is carried out at 95° C. by the conventional direct method without reducing agent, the dyeing obtained is about three times weaker.

When the 100 parts of viscose staple fiber material are replaced by 100 parts of viscose filament material in the above process, a strong, brilliant blue dyeing is obtained which is also about three times stronger than a dyeing produced on the same material by the conventional direct dyeing method at 95% C.

What is claimed is:

1. A process for dyeing natural and regenerated cellulose with an organic dioxazine of the formula

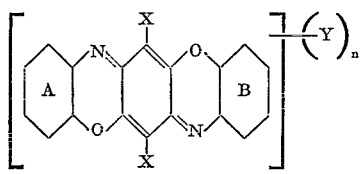

in which Y represents a member of the group consisting of a sulfonic acid and a carboxylic acid group, $n$ represents an integer from 1 to 4 and X represents a halogen atom, and in which the rings A and B may contain further substituents and condensed rings, wherein the dyestuff is reduced to the leuco form with a strong reducing agent in an aqueous solution having a pH value of at least 9 and the leuco compound is subsequently reoxidized on the fiber.

2. A process as claimed in claim 1, wherein the dyestuff in reduced form is applied to the material by padding and is then reoxidized.

3. A process as claimed in claim 1, wherein the dyestuff is padded on to the material and fixed thereon by storing the material in the absence of air.

4. A process as claimed in claim 1, wherein a neutral salt is also added to the dyebath.

5. A process as claimed in claim 1, wherein the reducing agent used is a member of the group consisting of sodium hydrosulfite, thiourea dioxide and an α-hydroxyalkanesulfinic acid derivative.

6. A process as claimed in claim 1, wherein there is also added to the dyebath a redox catalyst, which is a member of the group consisting of a chelate complex and a chelate of a polyvalent transition metal in which the lowest valency in the complex is not the most stable one.

7. A process as claimed in claim 6, wherein the chelate compound is used in an amount between 0.01 and 1% based on the total weight of the preparation.

References Cited

UNITED STATES PATENTS 2,845,420  7/1958  Freyermuth et al. ____ 260—246

FOREIGN PATENTS 815,840  7/1959  Great Britain.
111,904  12/1917  Great Britain.

NORMAN G. TORCHIN, Primary Examiner

J. E. CALLAGHAN, Assistant Examiner

U.S. Cl. X.R.

8—34, 69